United States Patent [19]

Narasimha

[11] 4,131,766
[45] Dec. 26, 1978

[54] DIGITAL FILTER BANK
[75] Inventor: Madihally J. Narasimha, Mountain View, Calif.
[73] Assignee: Granger Associates, Menlo Park, Calif.
[21] Appl. No.: 814,303
[22] Filed: Jul. 11, 1977
[51] Int. Cl.² ............................................. H04J 1/00
[52] U.S. Cl. ................................ 179/15 FD; 364/726
[58] Field of Search ........................ 179/15 FD, 15 FS; 235/152, 156; 325/42; 364/726

[56] References Cited
U.S. PATENT DOCUMENTS

| | | | |
|---|---|---|---|
| 3,605,019 | 9/1971 | Cutter | 179/15 FD |
| 3,891,803 | 6/1975 | Daguet | 179/15 FS |
| 3,971,922 | 7/1976 | Bellanger | 179/15 FS |

Primary Examiner—Kathleen H. Claffy
Assistant Examiner—Joseph A. Popek
Attorney, Agent, or Firm—Flehr, Hohbach, Test, Albritton & Herbert

[57] ABSTRACT

Disclosed is a digital filter for modulating and demodulating in frequency division multiplexing systems. For modulating a number of voice channels, a Fourier transform processor computes the discrete Fourier transform of a first series of data samples representative of the number of voice channels in time division multiplex format. A weighting network weights the transformed samples with predetermined weighting coefficients to form a frequency division multiplexed signal with proper passband characteristics. For demodulating a frequency division multiplexed signal the weighting network weights the samples with predetermined weighting coefficients and the Fourier transform processor computes a discrete Fourier transform of the weighted samples to form a time division multiplexed signal representative of the number of voice channels.

20 Claims, 16 Drawing Figures

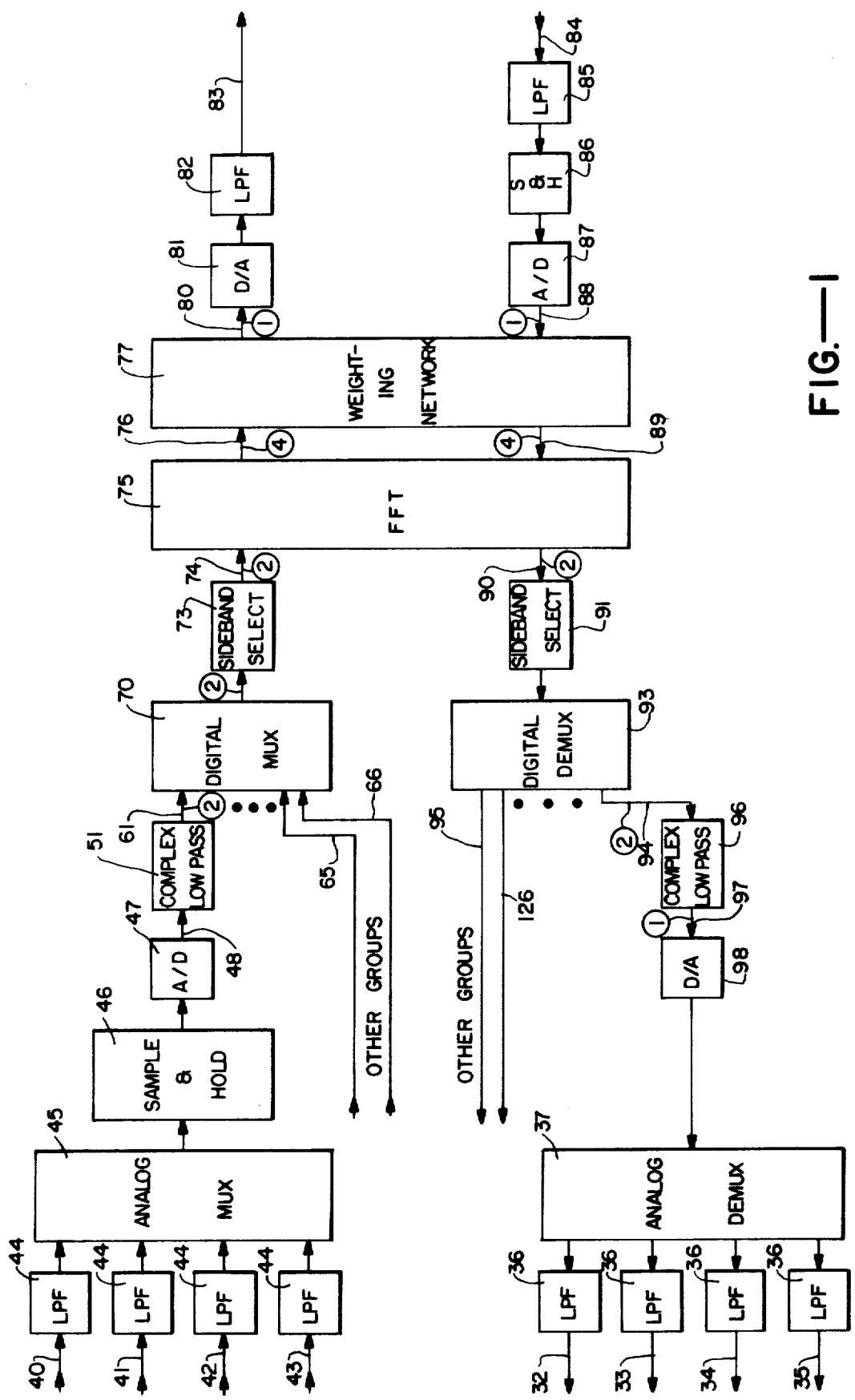
FIG.—1

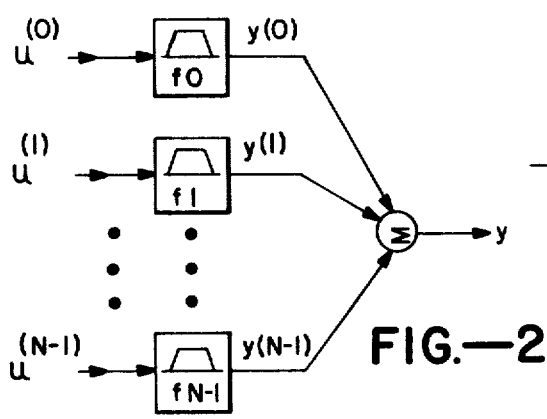
FIG.—2
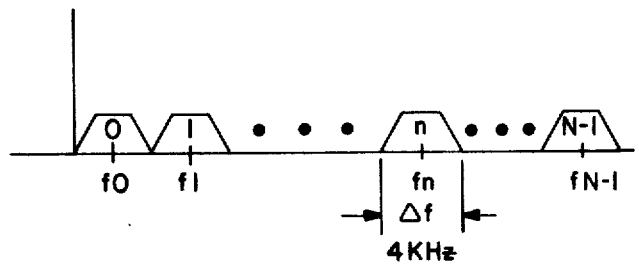
FIG.—3
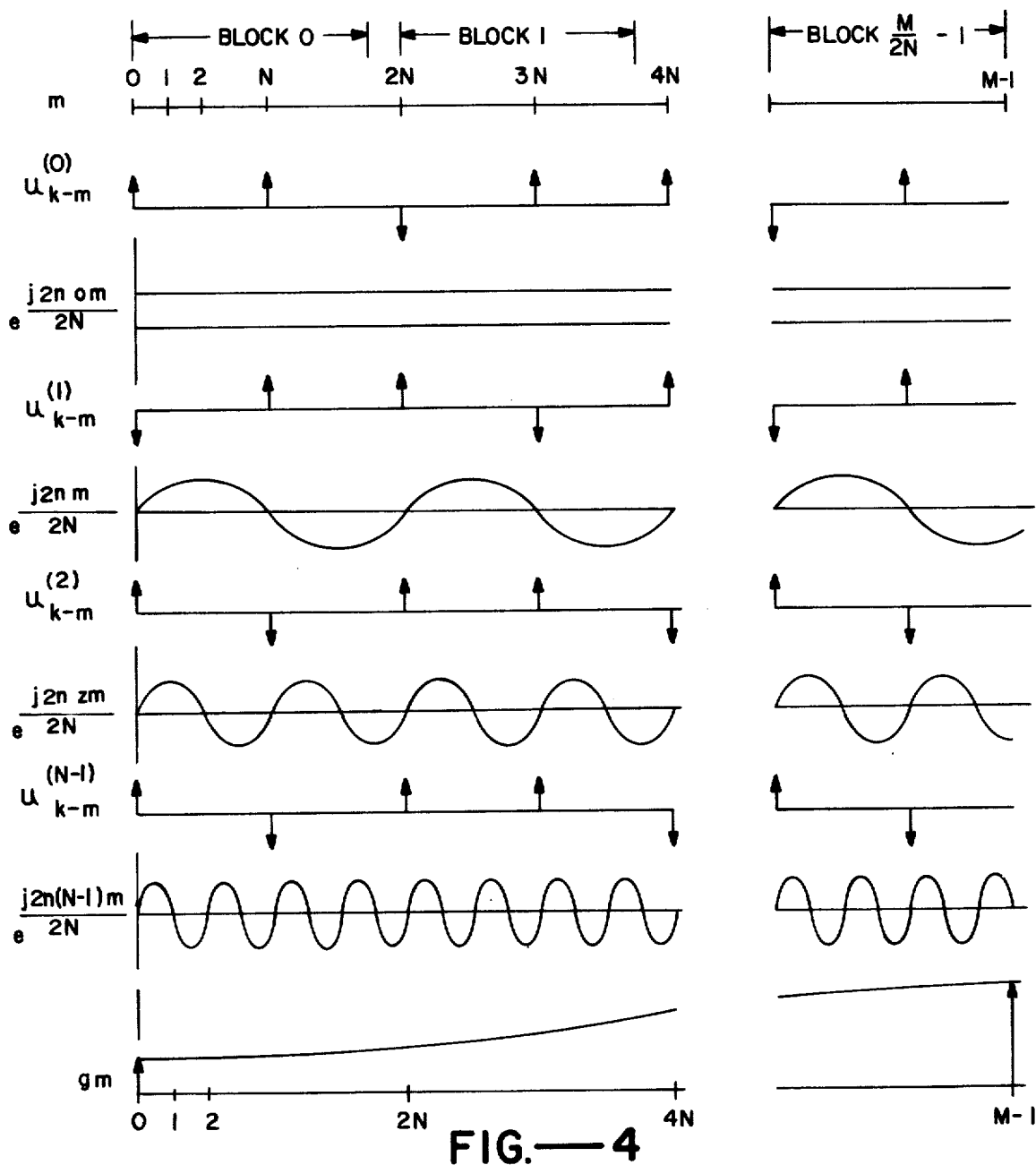
FIG.—4

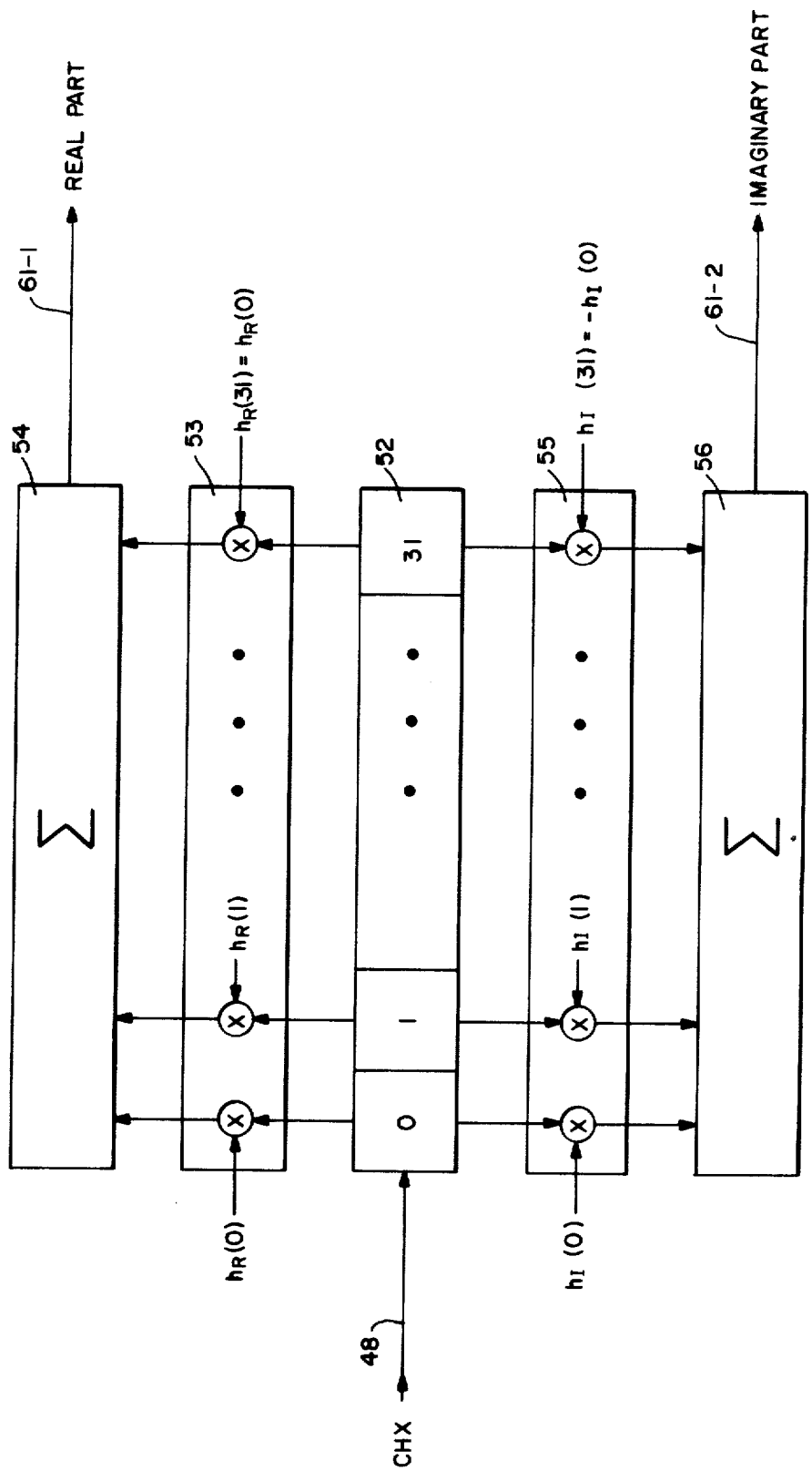
FIG.—5

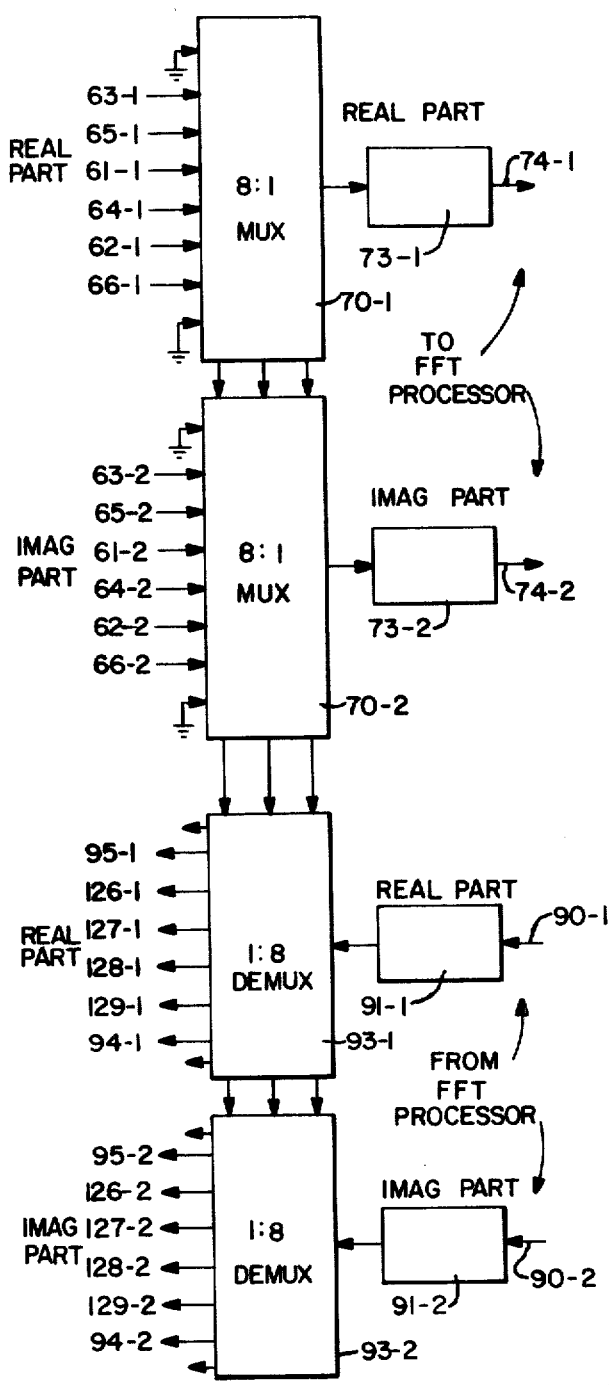
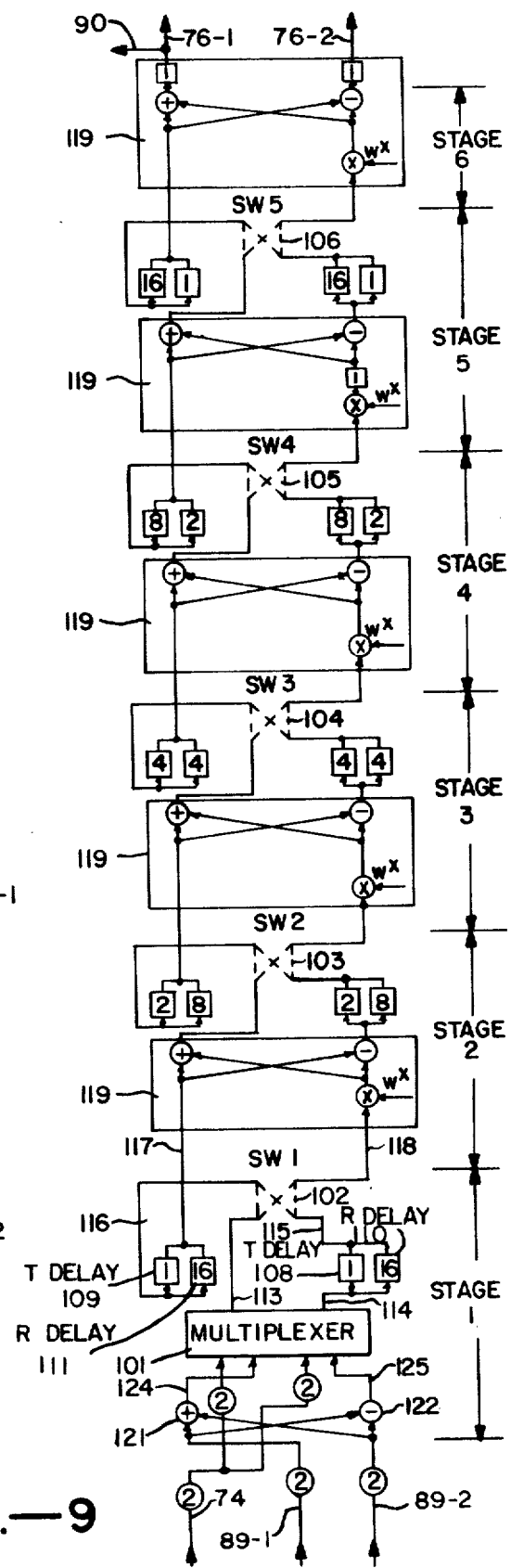
FIG.—6
FIG.—9

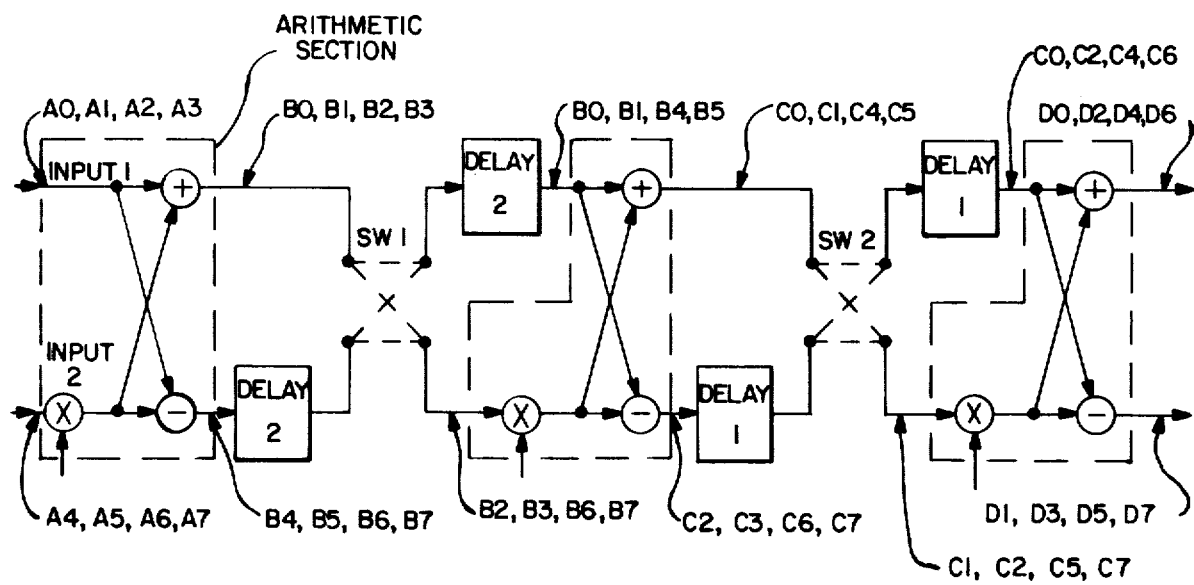
FIG.—7
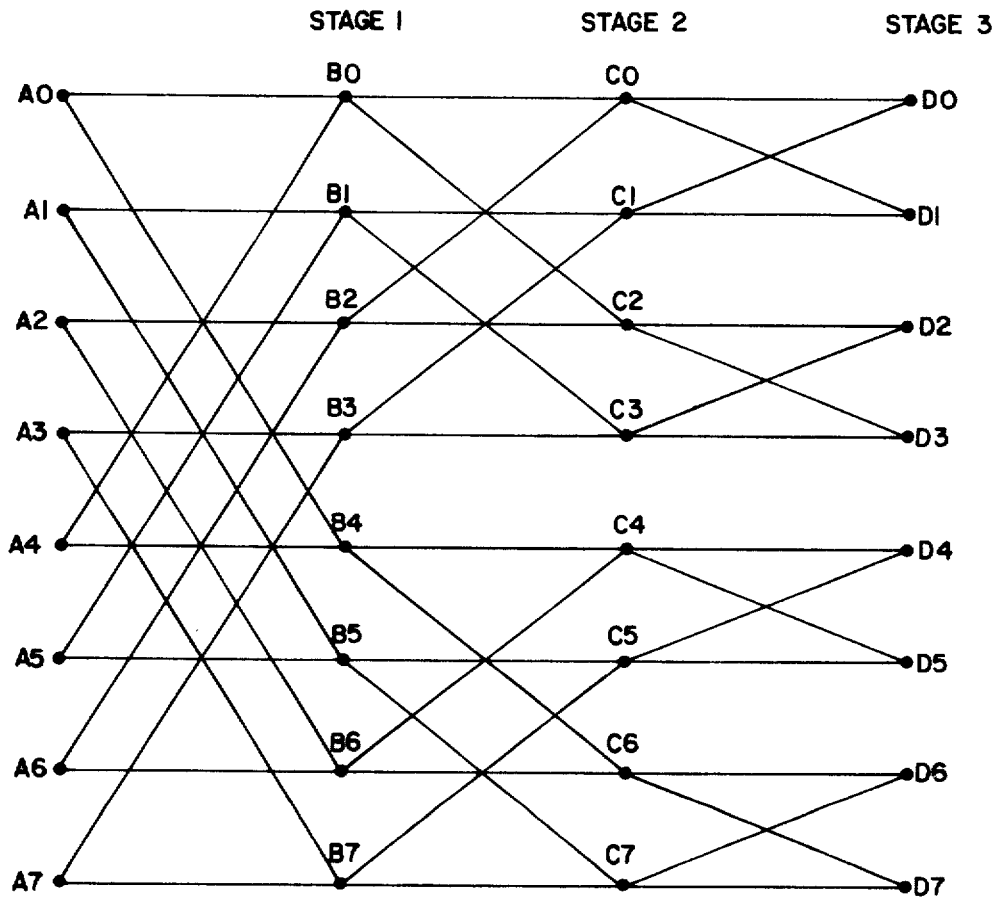
FIG.—8

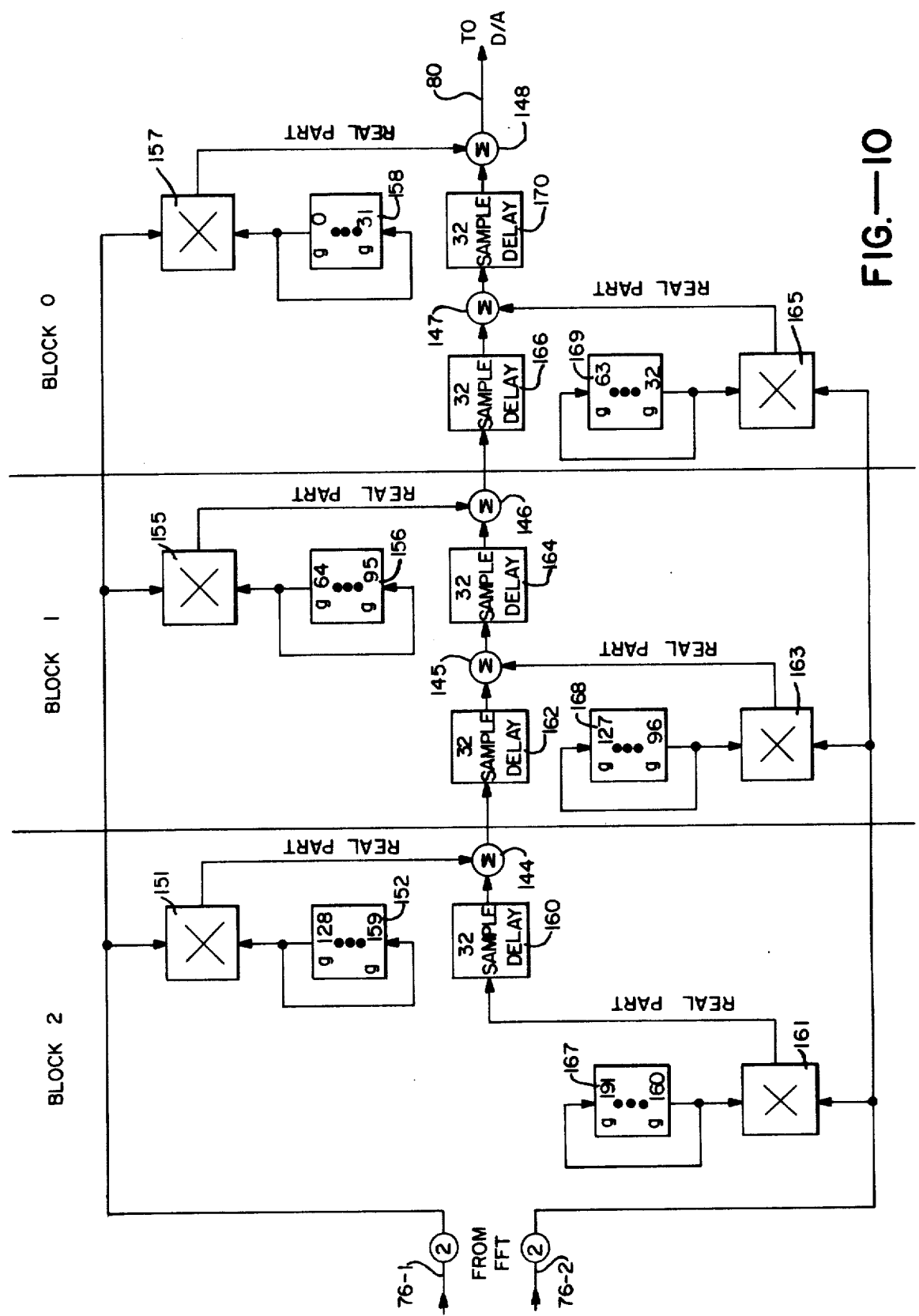

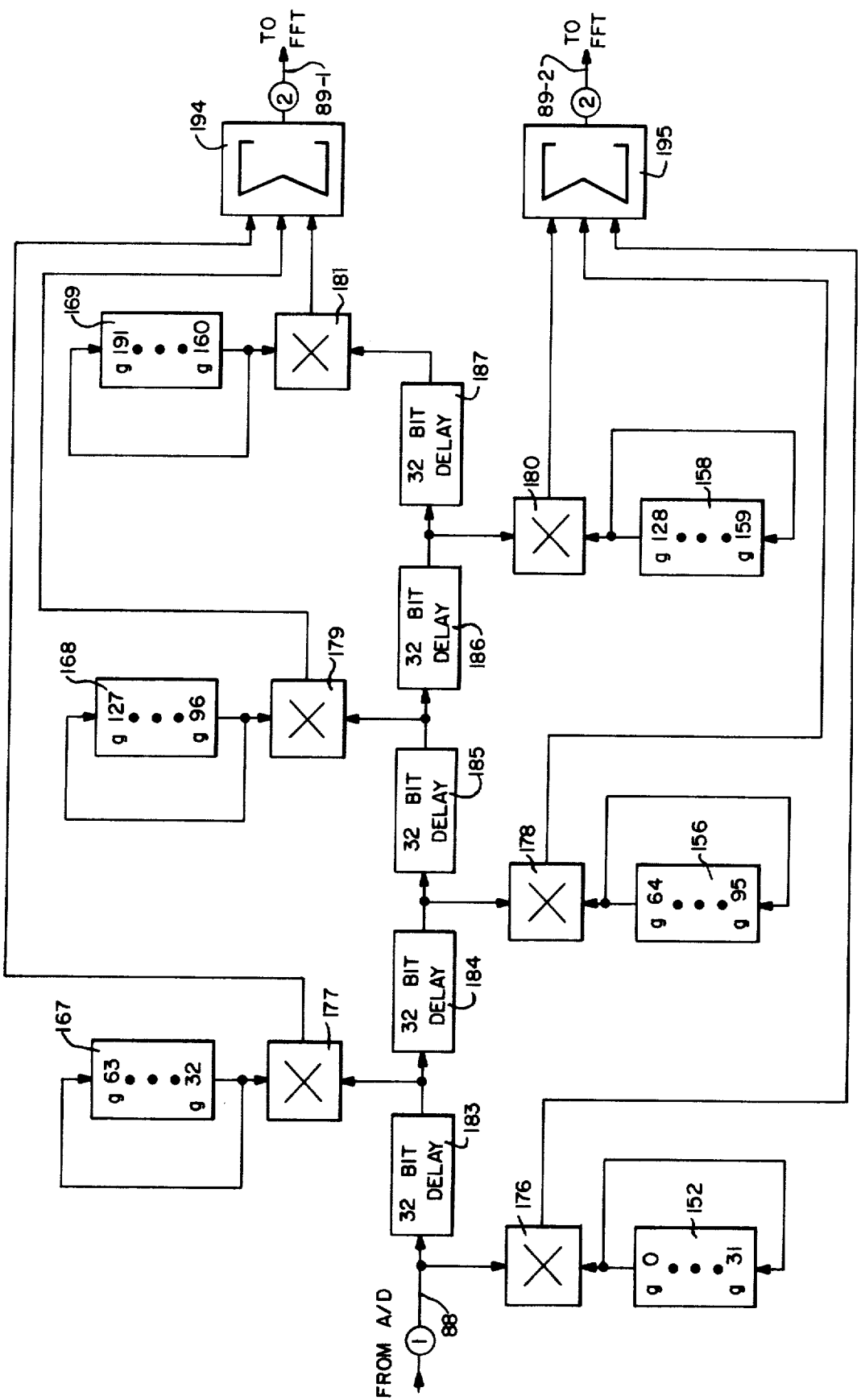
FIG.—11

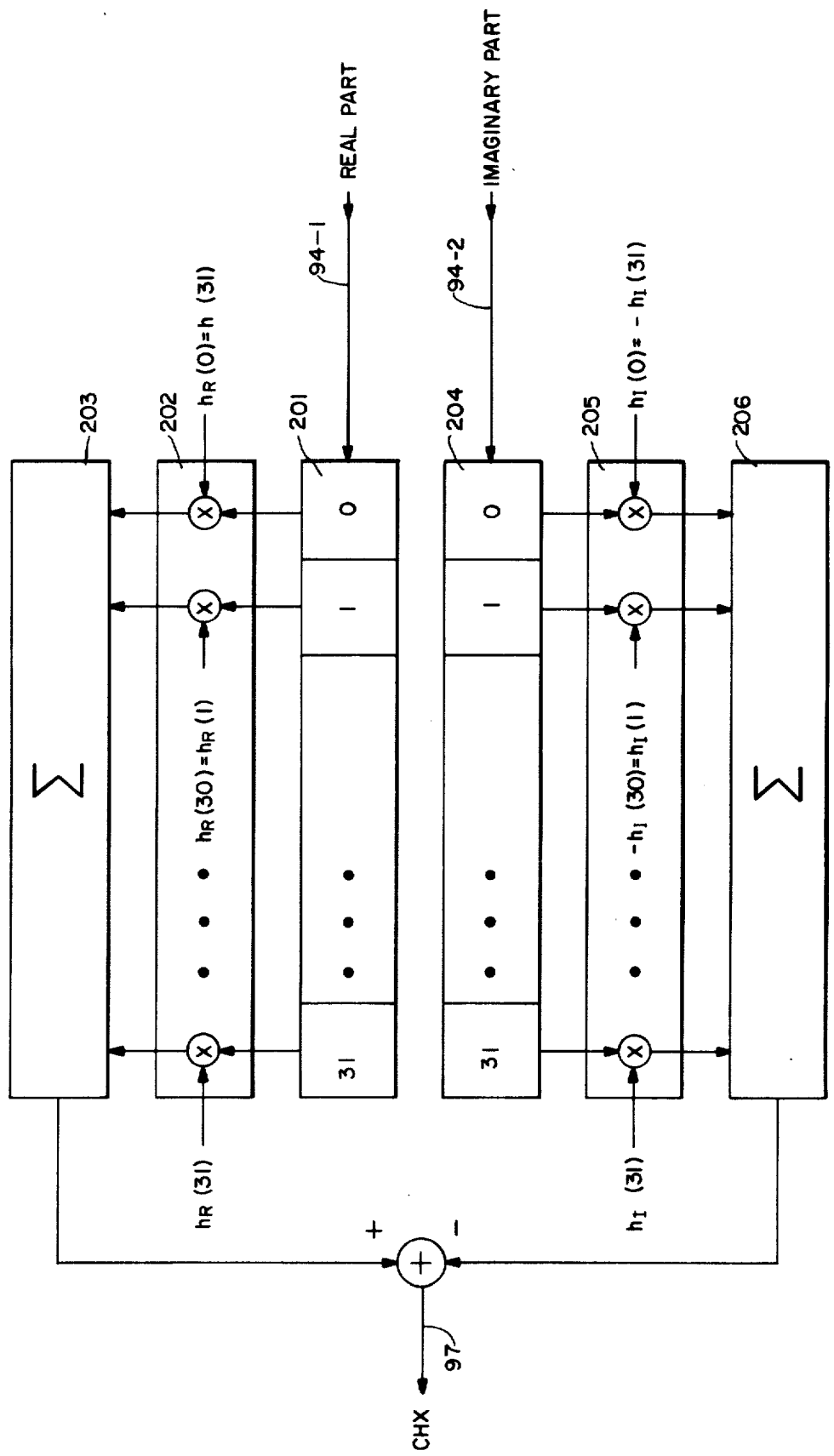
FIG.—12

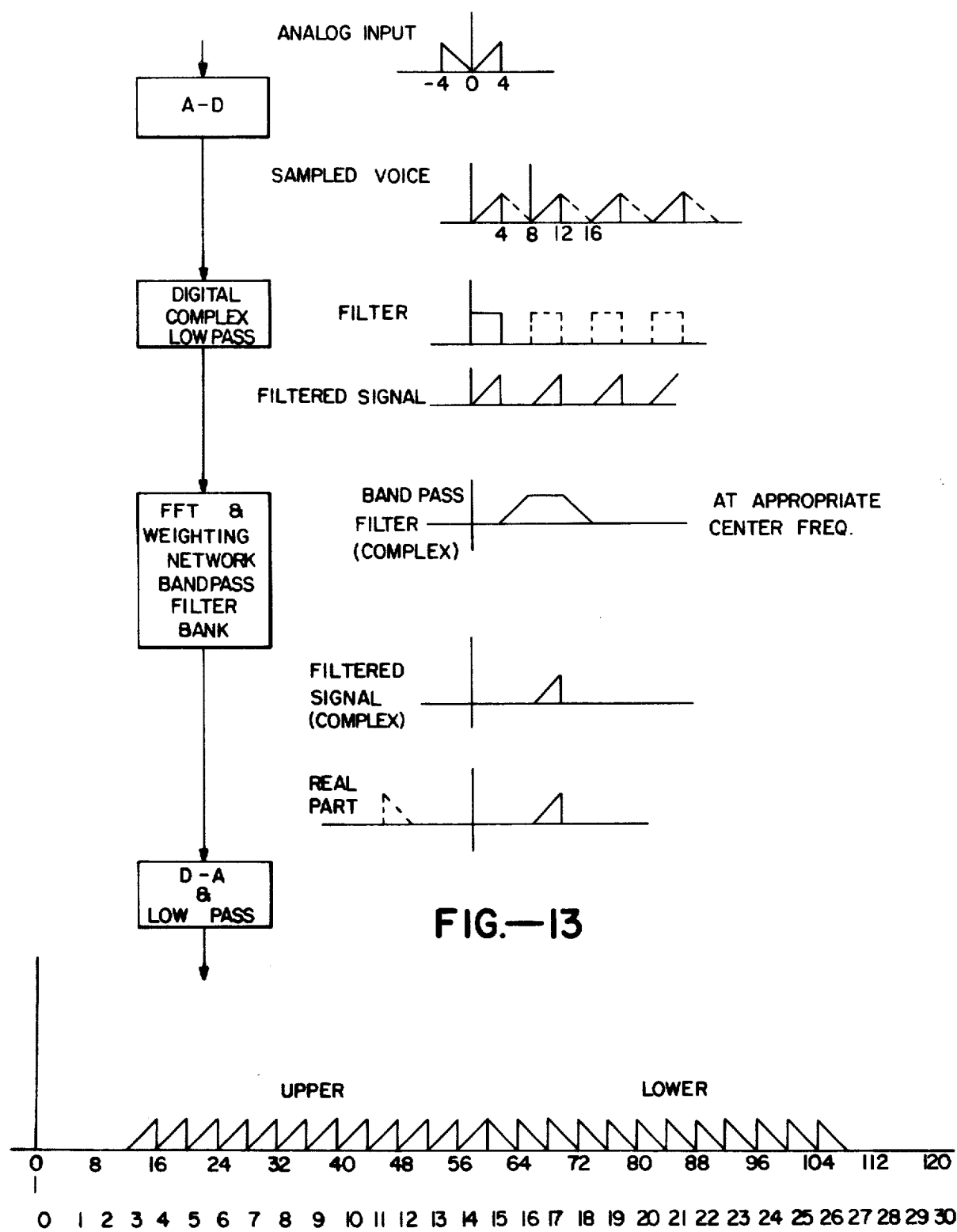

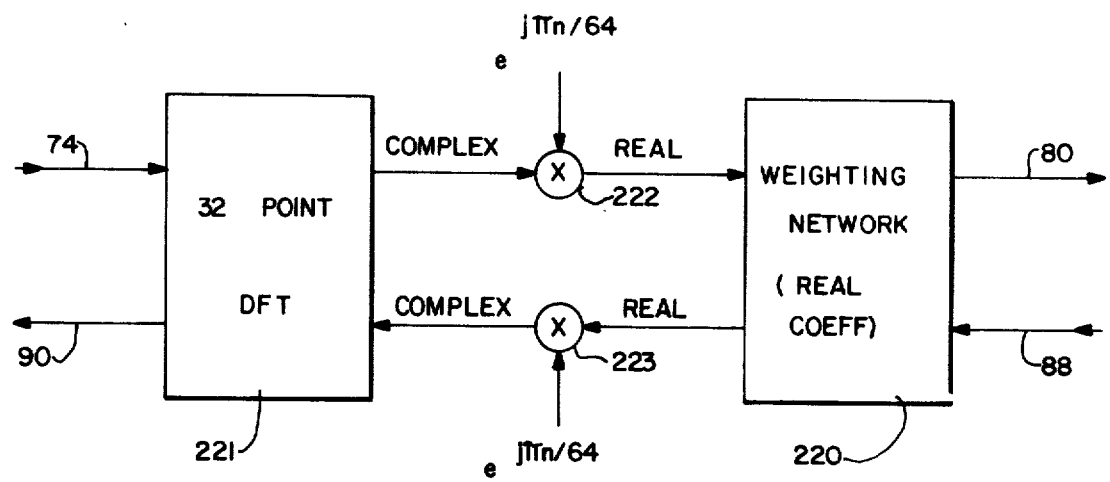
FIG.— 15
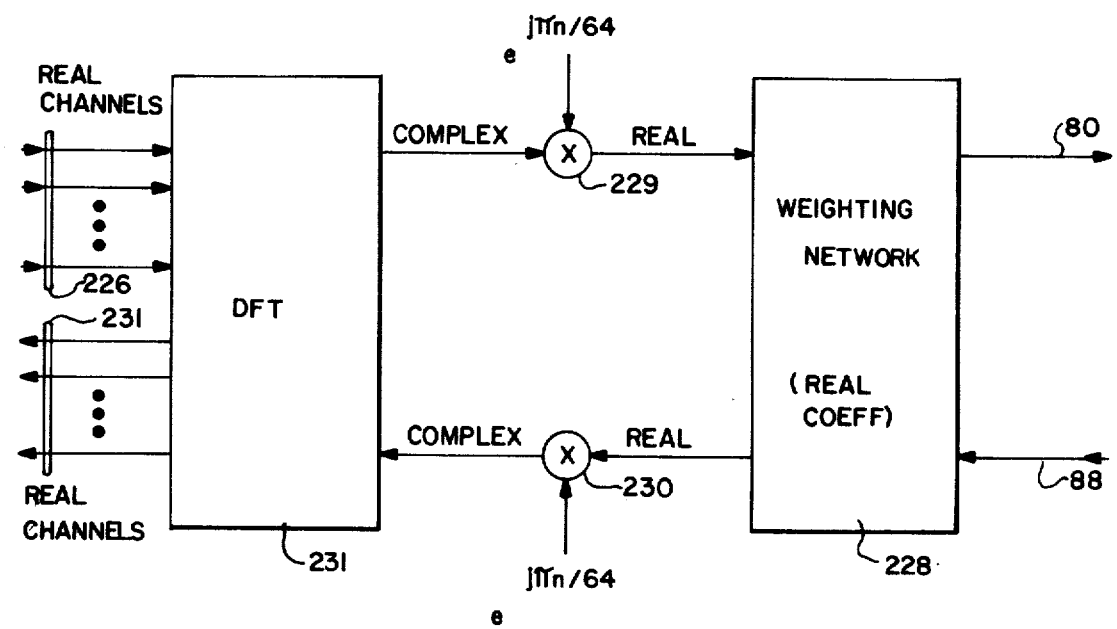
FIG.— 16

DIGITAL FILTER BANK

BACKGROUND OF THE INVENTION

The present invention relates to a digital filter bank for a voice multiplexing system.

The problem of designing a bank of bandpass filters occurs frequently in many signal processing systems, including spectrum analyzers and frequency division multiplexing (FDM) systems. Realization of such a filter bank is a particularly difficult task using analog techniques. The normal practice has been to design a standard bandpass filter with a suitable center frequency and to use a combination of frequency shifting and filtering to achieve the desired processing.

In a digital environment, it is not necessary to follow this practice. In theory, computing a discrete Fourier transform by use of a fast Fourier transform (FFT) or a Winograd Fourier Transform Algorithm (WFTA) together with a suitable weighting function could act as a bank of constant bandwidth filters.

A fast Fourier transform (FFT) is a computational technique of sequentially combining progressively larger weighted sums of data samples so as to produce discrete Fourier transform coefficients. The FFT technique can be interpreted in terms of combining the discrete Fourier transforms of individual data samples such that the occurrence times of these samples are taken into account sequentially and applied to discrete Fourier transforms of progressively larger mutually exclusive subgroups of data samples, which are combined to ultimately produce the discrete Fourier Transform of the complete series of data samples. A typical article describing the fast Fourier transform appears in *IEEE Transactions on Computers*, Nov. 1970, pp. 354–358.

Similarly, a Winograd Fourier Transform Algorithm (WFTA) is a technique for computing the discrete Fourier transform which significantly reduces the number of multiplication operations required. A typical article describing the Winograd Fourier Transform Algorithm appears in *IEEE Transactions on Acoustics, Speech, and Signaling Processing*, Vol. ASSP-25, No. 2, April 1977.

However, prior art systems utilizing digital filter techniques have generally not been capable of utilizing a hardware approach with fast Fourier or Winograd transform techniques as there are problems in attaining the necessary hardward complexity in order to utilize these transform techniques.

In view of the above background, it is desirable to provide a digital filter bank for voice multiplexing systems utilizing Fourier transform techniques such as described.

SUMMARY OF THE INVENTION

The present invention relates to a digital filter bank for use in a voice multiplexing system.

In one embodiment, a Fourier transform processor is provided to transform a series of data samples in time division multiplexed format representing a number of voice channels into a series of data samples in frequency division multiplexed format having predetermined frequency components for each voice channel, thereby representing the voice channels in a frequency spectra. The Fourier transform processor could be one which utilizes a fast Fourier transform or Winograd Fourier Transform Algorithm. A weighting netwoik is provided for weighting the frequency components with weighting coefficients having predetermined passband characteristics. The weighting coefficients can be either complex or real.

The weighting network is also provided for weighting a series of data samples in frequency division multiplexed format representative of a number of voice channels with predetermined weighting coefficients. A Fourier transform processor is provided for transforming the weighted signal into a signal in time division multiplexed format representing the number of voice channels.

In another embodiment, a complex low pass filter is provided for receiving a series of time division multiplexed data samples representative of a number of voice channels. The complex low pass filter operates to generate a complex analytic signal for each voice channel. An analytic signal is a complex signal in which the negative frequency component is suppressed. A Fourier transform processor is provided for transforming the signals for each of the voice channels into a frequency division multiplex format having predetermined frequency components for each voice channel, thereby representing the voice channels in a frequency spectra. A weighting network is provided for weighting the transformed data samples for each of the voice channels with weighting coefficients having predetermined passband characteristics, thereby representing the voice channels in a frequency domain with proper passband characteristics.

The weighting network is also provided for receiving a frequency division multiplexed signal representative of a number of voice channels. The weighting network operates, with appropriate delays, to form a complex signal by weighting the data samples with predetermined weighting coefficients. The Fourier transform processor is provided to transform the weighted signal into a time division multiplexed format. The complex low pass filter forms a series of time division multiplexed data samples representing the number of voice channels.

It is therefore an object of the present invention to provide an improved digital filter bank for use in a voice multiplexing system utilizing fast algorithms for computing the discrete Fourier transform.

It is another object to provide a digital filter that has fewer hardware components and thereby reduces the cost of the system.

It is another object to provide a digital filter bank that reduces the amount of computation time required.

Additional objects and features are set forth in the description which follows.

DESCRIPTION OF THE DRAWINGS

FIG. 1 depicts a block diagram of one embodiment of the present invention.

FIG. 2 depicts a bank of bandpass filters for N audio channels.

FIG. 3 depicts a frequency scheme for a frequency division multiplex system.

FIG. 4 depicts a conceptual representation in accordance with the theoretical description of the present invention.

FIG. 5 depicts a transmitter portion of a complex low pass filter, which forms a portion of FIG. 1.

FIG. 6 depicts a multiplexer and demultiplexer circuit, which forms a portion of FIG. 1.

FIG. 7 depicts two stages of an exemplary fast Fourier transform processor.

FIG. 8 depicts a flow diagram for a three stage fast Fourier transform processor.

FIG. 9 depicts a six stage fast Fourier transform processor, which forms a portion of FIG. 1.

FIG. 10 depicts a transmitter portion of a weighting network, which forms a portion of FIG. 1.

FIG. 11 depicts a receiver portion of a weighting network, which forms a portion of FIG. 1.

FIG. 12 depicts a receiver portion of a complex low pass filter, which forms a portion of FIG. 1.

FIG. 13 depicts the frequency spectra of various points along the block diagram depicted in FIG. 1.

FIG. 14 depicts a representative frequency spectra for one embodiment of the present invention.

FIGS. 15 and 16 depict alternative embodiments of a processor and weighting network.

DETAILED DESCRIPTION

Referring now to the block diagram of one embodiment of the present invention depicted in FIG. 1, a brief overview of the operation of the system will be given before going into a theoretical analysis and a detailed description of the drawings.

In FIG. 1, a 24 channel modem employing a digital filter is utilized with 12 of the channels being available for translation into the 60-108 KHz band, as depicted in FIG. 14, so that the modem is compatible with existing voice frequency multiplexers. In addition, the modem can be used to interface with a 24 channel PCM system for TDM-FDM translation.

In FIG. 1, individual voice channels are collected in groups of four and sampled at 8 KHz. The sampled signal for four voice channels is therefore a time division multiplexed signal with a sample rate of 32 KHz. Other groups are multiplexed in a similar fashion. Each group of 4 voice channels in one embodiment of the present invention are input to a complex low pass filter which utilizes a Hilbert transformer (90° phase shifter). The filter yields an analytic signal for each voice channel in which the negative frequency component is suppressed but which has a spectrum still periodic with a period equal to 8 KHz. Such an output from the complex low pass filter is shown in FIG. 13. The output from each of the complex low pass filters is multiplexed to form a complex signal representing all of the voice channels.

The complex signal from all the voice channels is then passed through a 64 point discrete Fourier transform processor, which places the individual channels at the proper center frequency. The Fourier transform processor effectively transforms the time division multiplexed signal into a frequency division multiplexed signal.

However, the passband characteristics of the signal from the processor are still unsatisfactory and the signal is therefore input to a weighting network, in order to give the required passband characteristics to each of the frequency components of the processed signal.

The weighted signal is then converted to an analog signal by a D/A converter. Finally, the analog signal is low pass filtered and fed to a group modem.

The steps for demodulating a frequency division multiplexed signal are essentially the reverse steps as described for modulation.

The frequency spectra at various points within the digital filter is depicted in FIG. 13.

Theoretical Discussion

A theoretical approach of the present invention will be discussed for frequency multiplexing N voice channels and stacking them up in the range 0–4N KHz. The output signal must be sampled at a frequency of 8N KHz or higher in order to satisfy the Nyquist sampling theorem. However, the individual channels are band-limited to 4 KHz and hence can be sampled at a frequency of 8 KHz. The spectrum of such a sampled voice signal is shown in FIG. 13. In order to match the output rate, the sampling frequency of the individual voice channels has to be increased by a factor of N. This can be accomplished by inserting N−1 zero-valued samples between each of the original samples. Insertion of zeros creates a signal whose spectrum is periodic with a period equal to the original sampling frequency, as depicted in FIG. 13, for N=4. If the voice channels, with zeros filled in, are passed through N equispaced bandpass filters, each with 4 KHz bandwidth, then the required frequency division multiplexed signal can be obtained by summing the outputs of the filters. However, if upright (or, alternately, inverted) sidebands are desired for all the channels, the spectrum of alternate channels need to be inverted before bandpass filtering. These are channels that occupy the ranges 4–8 KHz and 12–16 KHz in FIG. 13. This spectral inversion is easily achieved by negating alternate samples in the original signal sampled at 8 KHz.

FIG. 2 depicts the scheme of single sideband (SSB) modulation for the FDM system. $u^{(0)}, u^{(1)}, \ldots, u^{(N-1)}$ denote the N voice frequency channels, properly filled in with zeros. The N bandpass filters are finite impulse response (FIR) type, each having a bandwidth of $\Delta f$(4 KHz) and the impulse response of the $n^{th}$ filter is given by $$h(mT) \cos 2\pi f_n mT \qquad (1)$$

where h(mT) is the impulse response of a FIR prototype lowpass filter, $f_n$ is the center frequency given by $$f_n = (n + \tfrac{1}{2}) \Delta f \qquad (2)$$

and T is the sampling period. Assuming that the output is sampled at the Nyquist rate $$T = \frac{1}{2N\Delta f} \qquad (3)$$

then the output of the $n^{th}$ bandpass filter at time kT is $$y^{(n)}(kT) = \sum_{m=0}^{M-1} u^{(n)}[(k-m)T] \, h(mT) \cos 2\pi f_n mT \qquad (4)$$

where the impulse response of the FIR lowpass filter is assumed to be of duration M. Substituting (2) and (3) in (4) and letting $h_m$ denote h(mT), etc., results in $$y_k^{(n)} = Re \sum_{m=0}^{M-1} (h_m e^{j\pi m/2N}) \, e^{j2\pi mn/2N} u_{k-m}^{(n)} \qquad (5)$$

where Re[x] denotes the real part of x. Defining $$g_m = h_m e^{j\pi m/2N} \qquad (6)$$

the above equation can be rewritten as $$y_k^{(n)} = Re \sum_{m=0}^{M-1} g_m e^{j2\pi mn/2N} u_{k-m}^{(p)} \quad (7)$$

The output of the filter-bank at time kT is $$y_k = \sum_{n=0}^{N-1} y_k^{(n)} \quad (8)$$

Substituting (7) in (8) and interchanging summations yields $$y_k = Re \sum_{m=0}^{M-1} g_m \sum_{n=0}^{N-1} u_{k-m}^{(p)} e^{j2\pi mn/2N} \quad (9)$$

Since there are $N-1$ zeroes inserted between each of the original samples, the inner summation in (9) in nonzero only when $k-m$ is a multiple of N.

Consider a situation when a nonzero set of input samples enters the FIR filters as depicted in FIG. 4. Furthermore assume that $M/2N$ is an integer P and that the entire length of the FIR filters is divided into blocks of duration 2N each. Then, there are only two sets of nonzero samples in each block. For example, the sets $u_k^{(n)}$ and $u_{k-n}^{(n)}$, $n=0, 1, \ldots, N-1$, correspond to the zeroth block. With a change of variables, $$m = 2Np+q, \ p=0,1,\ldots, P-1, \text{ where } P=M/2N$$
$$q=0,1,\ldots, 2N-1 \quad (10)$$

the output $y_k$ can be written as a summation of contributions from individual blocks:

$$y_k = Re \sum_{p=0}^{P-1} y_{k,p} \quad (11)$$

where the contribution $y_{k,p}$ of the $p^{th}$ block to the output at time k is defined by $$y_{k,p} = \sum_{q=0}^{2N-1} g_{2Np+q} \sum_{n=0}^{N-1} u_{k-(2Np+q)}^{(p)} e^{j2\pi nq/2N} \quad (12)$$

By setting $u^{(N)}, u^{(N+1)}, \ldots, u^{(2N-1)}$ to be identically zero for all time, the inner sum in (12) can be recognized as the Fourier transform of the sequence $$u_{k-(2Np+q)}^{(p)}, \ n = 0, 1,\ldots,2N - 1 \quad (13)$$

at time $k-(2Np+q)$ and frequency q. Denoting this by $U[k-(2Np+q), q]$, the contribution of the $p^{th}$ block is $$y_{k,p} = \sum_{q=0}^{2N-1} g_{2Np+q} U[k - (2Np+q), q] \quad (14)$$

In order to illustrate how the complete Discrete Fourier Transform (DFT) sequence of $u_k^{(n)}, n=0,1, \ldots, 2N-1$, can be made use of to calculate the next $2N-1$ output points, consider the contribution of the zeroth block ($p=$)) to the output $y_k$. From (14) this is given by $$y_{k,0} = \sum_{q=0}^{2N-1} g_q U(k - q, q) \quad (15)$$

Referring to FIG. 4 (in which only sinewaves have been shown for simplicity) and remembering that a nonzero set of input samples enter the FIR filters at time k, it is clear that there are only two values of q— these being 0 and N— for which (15) is nonzero. Hence $$y_{k,0} = g_0 U(k,0) + g_N U(k-N, N) \quad (16)$$

The contribution of the zeroth block for the next $N-1$ output sample periods is given by $$y_{k+r,0} = \sum_{q=0}^{2N-1} g_q U(k + r - q, q), \ r = 1,2,\ldots,N - 1 \quad (17)$$

However, during this time only zero sets of inputs enter the FIR filter and there will still be only two cases, $q = r$ and $q = r+N$, for which (17) is nonzero. Therefore, in general $$y_{k+r,0} = g_r U(k,r) + g_{N+r} U(k-N, N+r) \ r=0,1,\ldots,N-1 \quad (19)$$

At time $k+N$ another set of nonzero input samples arrive, but the ones corresponding to time $k-N$ will have been shifted out of the zeroth block. Thus the computation of $y_{k+N,0}, \ldots, y_{k+2N-1,0}$ is described by $$y_{k+N+r,0} = g_r U(k+N,r) + g_{N+r} U(k,N+r) \ r=0,1,\ldots,N-1 \quad (19)$$

It is clear from the above discussion that as the nonzero set of samples $$u_k^{(n)}, \ n=0,1,\ldots, 2N-1 \quad (20)$$

shift across the zeroth block the DFT of (20) defined by $$U(k,q) = \sum_{n=0}^{2N-1} u_k^{(n)} e^{j2\pi nq/2N}, \ q = 0,1,\ldots,2N - 1 \quad (21)$$

will get involved in the computation of $y_k, \ldots, y_{k+2N-1}$. Similar arguments are applicable to other blocks. It should also be obvious from FIG. 4 that once the sequence $U(k,q)$ is calculated, it does not have to be recalculated when the point set (20) moves over to the next blocks.

In view of the above arguments the output of the filter-bank at any time $k+r$ (where k refers to the time of arrival of a new set of nonzero inputs) can be written as $$y_{k+r} = Re \sum_{p=0}^{P-1} [g_{2Np+r} U(k - 2Np,r) + g_{2Np+N+r} U(k - 2Np - N, N+ r)] \quad (22)$$
$$r = 0,1,\ldots, N - 1$$

where the terms inside the summation indicates the contribution of the $p^{th}$ block.

The DFT sequence (21) can be efficiently calculated using the Fast Fourier Transform (FFT) or Winograd Fourier Transform Algorithm (WFTA).

Referring to FIG. 4, the voice channels are sampled at a frequency of 8 KHz. At every input sampling instant (that is, at 125 μs interval), a 2N point DFT is performed. The input data to the DFT processor is formed by taking one sample from each of the N channels and appending these with N zeros. The resulting 2N frequency components are multiplied with appropriate filter coefficients $g_m$ and added to the corresponding values obtained from other delays. The real part of the summation yields the modulated signal.

As an indication of computation required, consider a 128 channel FDM system with a filter degree of M = 2048. With this value of M it is possible to have a bandpass filter with 1 dB passband ripple, 80 dB stop-band attenuation and a transition width of some 30% of channel width. For each output sampling interval (approximately 1 μs), M/N complex multiplications by the filter coefficients are required. Since only the real part of the output is required, this amounts to 2M/N = 32 real multiplications. The FFT computations for two blocks of input data requires $4N\log_2 2N$ real multiplications, which amounts to 4096. However, this needs to be done at ½N of the output rate. Hence the total number of real multiplications per output sample is equal to 32 + 4096/256 = 48.

The Fourier transform operation and the multiplication of the outputs of the shift registers with the filter coefficients can be efficiently implemented using the Arcsine transform. This involves making an Arcsine transformation on the input signal and storing the filter coefficients in their Arcsine form. By doing this, multiplications will be converted to table look-ups and additions.

In a theoretical approach of the present invention for demodulation, the broadband frequency multiplexed signal sampled at 8N KHz has to be demodulated into N channel outputs. Again, the bank of bandpass filters shown in FIG. 2 has to be realized — now with one input signal $u_k$ and N channel outputs $y_k^{(u)}$, n=0,1,..., N−1. Since the output signals have to be brought to baseband, the required processing consists of bandpass filtering followed by frequency shifting. The latter operation, however, can be easily accomplished by undersampling the outputs of the bandpass filters. That is, only one out of every N output values of the bandpass filters is computed.

Using the same notation as discussed for modulation, the output of the $n^{th}$ bandpass filter at time k is given by $$y_k^{(n)} = Re \sum_{m=0}^{M-1} u_{k-m} g_m e^{j2\pi mn/2N} \quad (23)$$

where $g_m$ is defined in (6). Since one out of every N outputs is required (23) has to be computed only for k = Nr. Hence.

$$y_{Nr}^{(n)} = Re \sum_{m=0}^{M-1} u_{Nr-m} g_m e^{j2\pi mn/2N} \quad (24)$$

The input data is divided into blocks of length 2N each. This can be represented by a change of variables:

$$m = 2Np+q, \, p=0,1,..., P-1, \text{ where } P = M/2N$$
$$q=0,1,..., 2N-1 \quad (25)$$

Using this substitution in (24) yields $$y_{Nr}^{(n)} = \sum_{q=0}^{2N-1} \sum_{p=0}^{P-1} u_{Nr-(2Np+q)} g_{2Np+q} e^{j2\pi nq/2N} \quad (26)$$

Defining $$G(Nr,q) = \sum_{p=0}^{P-1} u_{Nr-(2Np+q)} g_{2Np+q} \quad (27)$$

(26) can be rewritten as $$y_{Nr}^{(n)} = Re \sum_{q=0}^{2N-1} G(Nr,q) e^{j2\pi nq/2N} \quad (28)$$

Hence the N channel outputs $$y_{Nr}^{(n)}, \, n=0,1,..., N-1 \quad (29)$$

can be evaluated by taking the DFT of the sequence G(Nr,q), q=0,1,..., 2N−1. Only the first N frequency components are made use of. As before the FFT or WFTA can be employed to expedite the computation in (28).

Since there is one output required in each of the N channels for every N input points, the evaluation of G(Nr,q) as in (27) is done in two separate blocks in order to pipeline the processing. The first N components, that is for q=0,1,..., N−1, are computed according to (27). The next N components are calculated as $$G(Nr, N+q) = \sum_{p=0}^{P-1} u_{Nr-(2Np+N+q)} g_{2Np+N+q}, \quad (30)$$
$$q = 0,1...,N-1$$

The input data for the DFT computation is formed by weighting the time function $u_k$ with the filter coefficients $g_m$ and a preliminary linkage according to (27) and (30). The first N input points to DFT are computed according to (27) (where q=0,1,..., N−1) and the next N points according to (30). Only the real part of the first N frequency components of the 2N point DFT are needed. These yield the channel outputs at the baseband rate.

Again, for M = 2048 and N = 128, the number of multiplications required during one input sample interval (≃ 1 μs) is 48. The weighting and Fourier transforming operations can also be efficiently achieved using the Arcsine transform.

As previously described, the conceptual operation of the digital filter can be visualized as inputting through a complex low pass filter up to four voice channels in time division multiplexed format through each filter. The low pass filter generates a complex signal which is still periodic but in which the negative frequency component is absent. The voice channels are then passed through a digital selector in which the format can be visualized as similar to a T1 line, still in TDM format. These channels are input to the fast Fourier transform processor which transforms the TDM format to a frequency division multiplex (FDM) format. The output of the FFT processor is an FDM format in which the voice channels now contain frequency components with an overlap between adjacent channels, which does not meet crosstalk characteristics requirements.

The weighting network operates on the overlap between adjacent channels to provide proper crosstalk attenuation and also to provide proper passband characteristics.

Typical values which can be utilized according to the basic modulation and demodulation theory as previously described are as follows:

M = 192 (the number of taps in the weighting network).
N = 32 (of which 24 channels are used).
Q = 64.
P = 3.

Other values are of course, possible, as long as they are consistent with the previously described theory.

Referring to FIG. 1, there is depicted a block diagram of one embodiment of the present invention.

Individual voice channels on buses 40–43 are passed through conventional low pass filters LPF 44 and into an analog multiplexer 45. The low pass filters 44 typically have a band pass of 0–4KHz, such as General Instruments Active Filter, Series 7000.

The four filtered voice channels are input to the conventional multiplexer 45 such as Teledyne Philbrick Differential Eight Channel and Single Ended Sixteen Channel Multiplexer (Model Number 4551/4552). In the present embodiment up to four voice channels are multiplexed by a single multiplexer 45 into a time division multiplexed format.

The voice channels are passed through a conventional sample and hold circuit 46 (Teledyne Philbrick 4129QZ) to form twelve bit, pulse code modulated (PCM) sample on bus 48 for each of the four channels. The samples are padded with four extra bits for a sixteen bit sample for each voice channel.

The voice channels are represented at the output of the analog to digital converter 47 at a 32 KHz rate.

The other groups input on bus 66 indicated in FIG. 1 will accommodate additional voice channels. In the present embodiment, six groups are utilized to provide for 24 channels. Such a multiplexing arrangement would be convenient for interfacing with a T1 line, a two wire digitally multiplexed line commonly used in PCM telephone switching systems.

However, the present invention is not limited to multiplexing 24 channels and can be designed to accommodate any number of voice channels.

Referring again to FIG. 1, the output of the analog to digital converter 47 on bus 48 is input to the complex low pass filter 51.

The function of the complex lowpass filter 51 is to convert the sampled voice channel for each input channel into an analytic signal, a complex signal having the negative frequency component suppressed. The technique used in the present embodiment for generating an analytic signal for each of the voice channels will be described in conjunction with FIG. 5.

Referring again to FIG. 1, the output of the complex low pass filter 51 for each of the groups is input to the conventional multiplexer 70 via bus 61 which multiplexes the outputs of the six groups into a time division multiplexed format at 256 KHz. The multiplexer 70 allows space for 32 voice channels, although only 24 voice channels are utilized in the present invention. Additional voice channels could be utilized.

The output of the digital multiplexer 70 is input to a conventional sideband selector circuit 73, which is designed to select the upright or inverted sidebands for a particular voice channel. An arrangement such as depicted in FIG. 14 shows the upright sidebands utilized in positions 3–14 and the inverted sidebands utilized in positions 15–26. The sideband selection is controlled by timing techniques (not shown) well known in the art.

The output of the sideband select circuit 73 is input via bus 74 to a fast Fourier transform processor 75.

The fast Fourier transform processor 75 is described in more detail in conjunction with FIGS. 7–9.

The function of the fast Fourier transform (FFT) processor 75 is to transform the analytic signal received from the complex low pass filter for each of the groups into a frequency division multiplexed signal utilizing computational techniques which greatly simplify the hardware requirements of typical digital filters.

The output of the FFT processor 75 is input via bus 76 to the weighting network 77 which functions to assign predetermined passband characteristics to each of the voice channels. The output of the FFT processor 75 is a frequency division multiplexed signal with overlap, in that the individual voice channels are assigned to a particular bandpass, but still do not meet crosstalk characteristic requirements of typical communication systems.

The output of the weighting network 77 is an input to a typical digital to analog converter 81 and low pass filter 82 for converting samples of the now frequency division multiplexed voice channels into an analog signal with proper passband characteristics as depicted in FIG. 14.

Such a digital to analog converter could be Teledyne Philbrick's model 4058 and the low pass filter could be a conventional 108 KHz passive filter.

Referring again to FIG. 1, in order to demodulate a frequency division multiplex signal such as input on bus 84 to the low pass filter 85, the reverse process is followed through the block diagrams. The analog to digital converter 87 and sample and hold circuits 86 could be Teledyne Philbrick 4130 and 4855 models respectively.

The output of the A/D 87 is input via bus 88 to the weighting network 77 and then into fast Fourier transform processor 75, which operate to convert the FDM signal into a time division multiplex signal having an analytic component.

The time division multiplex signal from processor 75 is demultiplexed through conventional demultiplexer 93 and input to the complex low pass circuit 96. The output of the complex low pass circuit generates a sample voice signal for up to four channels which is periodic for each channel which is converted by conventional D/A converter 98 and analog demux circuit 37 into the individual analog voice channels 32–35.

Referring to FIG. 5, the generation of an analytic signal for each of the voice channels will be described. The use of filter 51 enables the weighting network to utilize 192 taps, rather than 2048 taps.

The low pass filter 51 includes a 32 tap delay 52 for each voice channel. The filter 51 is a nonrecursive type shared by four channels. Each channel includes 16 bit samples as previously described, which are the 12 bit sample and 4 bits padding. Since there are 32 samples per channel for each delay, there is required storage capacity of 512 bits per voice channel.

In the present embodiment, each complex filter 51 processes four voice channels through time sharing techniques. Therefore, each complex filter utilizes a total storage of 2048 bits.

Data samples from a voice channel are sequentially introduced into the delay 52 via bus 48. These samples are multiplied in the conventional multiplier 53 (25LS14) by the filter coefficients which are seen in Table 1.

TABLE I

| COEFFICIENTS OF REAL FILTER | | COEFFICIENTS OF IMAGINARY FILTER | |
|---|---|---|---|
| $h_R(0) =$ | .00128174 | $h_I(0) =$ | −.00531006 |
| $h_R(1) =$ | −.01007030 | $h_I(1) =$ | −.00280762 |
| $h_R(2) =$ | −.00128174 | $h_I(2) =$ | .00399780 |
| $h_R(3) =$ | −.00921631 | $h_I(3) =$ | −.00329590 |
| $h_R(4) =$ | −.00335693 | $h_I(4) =$ | .00839233 |
| $h_R(5) =$ | −.01046753 | $h_I(5) =$ | −.00460815 |
| $h_R(6) =$ | −.00775146 | $h_I(6) =$ | .01605225 |
| $h_R(7) =$ | −.00942993 | $h_I(7) =$ | −.00497437 |
| $h_R(8) =$ | −.01535034 | $h_I(8) =$ | .02679443 |
| $h_R(9) =$ | −.00436401 | $h_I(9) =$ | −.00271606 |
| $h_R(10) =$ | −.02777100 | $h_I(10) =$ | .04141235 |
| $h_R(11) =$ | .00508716 | $h_I(11) =$ | .00585937 |
| $h_R(12) =$ | −.05032349 | $h_I(12) =$ | .06463623 |
| $h_R(13) =$ | .04013062 | $h_I(13) =$ | .03359985 |
| $h_R(14) =$ | −.11764526 | $h_I(14) =$ | .13082886 |
| $h_R(15) =$ | .30026245 | $h_I(15) =$ | .28982544 |

Because of the symmetry of the filter coefficients, $h_R(0) = h_R(31)$, $h_R(1) = h_R(30)$, and so on. Therefore, only 16 values of the real h coefficients are necessary to perform the proper multiplication of the voice samples for forming the real component of the complex signal. The samples multiplied by the filter coefficients are added in the conventional complex adder 54 (25LS15) and form on bus 61-1 the real part of the complex signal generated by the complex filter 51.

Similarly, the imaginary filter coefficients $h_I(0) - h_I(15)$ are multiplied by the sixteen bit voice samples in multiplier 55 and added in adder 56 and form on bus 61-2 the imaginary part of the complex signal. The imaginary filter coefficients of Table I have an inverted mirror symmetry and again only 16 coefficients are utilized.

The filtered signal is depicted in FIG. 13 as an output of the complex low pass filter 51. The negative frequency component of the same voice signal has been suppressed. The analytic signal for each voice channel is applied to the FFT 75.

The filter of FIG. 5 utilizes conventional time sharing techniques (not shown) in which up to four voice channels are filtered in a like fashion by the multiplier and adder circuitry. Other variations of the low pass filter are, of course, possible.

Referring now to FIG. 6, the complex signals from the low pass filters are input via buses 61-66 to a conventional eight to one multiplexer 70. Since there are real and imaginary components for each input, the multiplexer includes two circuits 70-1, 70-2. The present embodiment utilizes 24 channels, so that only six of the eight inputs to the multiplexer 70 actually have data, and hence uses only the inputs 61-66 to each multiplexer 70-1, 70-2. The unused inputs all set to zero.

The output of multiplexer 70 is a 256 KHz signal and is input to the sideband selecter 73, a conventional adder (25LS15), for selecting the desired upright or inverted side band. The side band to be selected in the present embodiment is shown in FIG. 14, in which the output of the voice channels in positions 15-26 are the inverted side bands and the voice channels in positions 3-14 are the upright side bands.

The output from selectors 73-1, 73-2 form inputs on buses 74-1, 74-2 to the fast Fourier transform processor 75 of FIG. 9.

The purpose of the FFT processor 75 is to take the discrete Fourier transform of the data samples input to the processor in accordance with the previously described theoretical approach.

The processor 75 thus transforms a time division multiplexed system into a frequency division multiplexed system. The techniques involved in utilizing such a processor are known in the art, but will be described briefly in conjunction with FIGS. 7-9.

As previously described, the fast Fourier transform is a computational technique of sequentially combining progressively larger weighted sums of data samples.

The FFT processor 75 includes stages for transmitting and receiving a 64 point decimation-in-time algorithm. For the receiver portion, there are normal inputs with bit reversed outputs. For the transmitter portion, there are bit reversed inputs and normal outputs.

The multiplication values utilized in the processor are sine or cosine values based upon the formulae sin ($2\pi$ K/64) and cos ($2\pi$ K/64), K = 0, ..., 31. These coefficients may be stored in commercially available PROMs (not shown).

The algorithm for the FFT processor using decimation in time is known as the Cooley-Tukey algorithm, and shown in FIGS. 7-8.

Referring to FIG. 8, a flow diagram of a Cooley-Tukey FFT is shown for an FFT processor with 3 stages (N = 8).

In FIG. 7 the inputs A0-A7 of the flow diagram (which are serial inputs) leave the arithmetic section of the first stage in the form:
B0 B1 B2 B3 (upper path)
B4 B5 B6 B7 (lower path)
This is because, as seen in FIG. 8 nodes B0 and B4 in Stage 1 operate on inputs A0 and A4 simultaneously, and so on.

The second stage operates on pairs separated by two. For example, node C0 operates on inputs B0 and B2 simultaneously. Thus, if the samples reach the arithmetic section of of the second stage of FIG. 7 in the form:
B0 B1 B4 B5
B2 B3 B6 B7
they will be in the right position for processing. This can be achieved by delaying the lower path in the first stage of FIG. 7 by two units to obtain

| B0 | B1 | B2 | B3 | | | |
|---|---|---|---|---|---|---|
| | | | | B4 | B5 | B6 | B7 | and then interchanging B2 and B3 with B4 and B5 to obtain

| B0 | B1 | B4 | B5 | | | |
|---|---|---|---|---|---|---|
| | | | | B2 | B3 | B6 | B7 |

Delaying the upper path by two units will produce the desired result:
B0 B1 B4 B5
B2 B3 B6 B7
Thus, in FIG. 7, data A0-A3 are input on input 1 and data A4-A7 are brought in through input 2.

Data leaving Stage 1 in the upper path are in the form B0 B1 B2 B3. B0 B1 are switched into delay 2 in the upper path. Data B2 B3 are switched into the lower path. Data B4 B5 B6 B7 are delayed in Dalay 2 in the lower path, then B4 B5 are switched into the upper path at the same time B2 B3 are switched into the lower path. B6 B7 are then switched into the lower path, thereby forming the correct result above.

This technique is implemented in a processor in FIG. 7 by making the delay in the lower path of each stage one half as long and utilizing a conventional selector switch (74157). The switch connects the upper and lower outputs of one stage to the next stage directly or interchanges them. The same process can be repeated for each stage in a similar manner.

The arithmetic unit shown includes a conventional multiplier (25LS14), adder and subtractor (25LS15). The data is multiplied by a rotation vector $\omega$ calculated by the formula $\cos 2\pi K/64 + j \sin 2\pi K/64$, $K = 0, 1, \ldots, 31$. The appropriate rotation vectors utilized in each stage in the present invention are described in Table II.

Referring to FIG. 9, the FFT processor is divided into the transmitter and receiver portions. Because the present embodiment provides for 32 channels and hence $2N = 64$, there are six stages utilized in each of the transmitter and receiver portions. The switches 102–106 are time shared in FIG. 9 and conventional selection techniques are utilized by the system to switch between transmitting and receiving portions.

The processor of FIG. 9 is a pipeline processor operating with a frequency of 256 KHz in transmitting (modulation) and receiving (demodulation) directions. Therefore, the conventional multiplexer (74157) is two line selector operating at 512 KHz to select data for the transmit or receive portions.

Data could be switched into and out of the FFT processor utilizing parallel rather than pipeline techniques.

Referring to FIG. 9, the operation of the six stage FFT processor 75 is similar to the processor described in conjunction with FIGS. 7–8.

During a transmitter cycle, the conventional multiplexer 101 (74157) selects data from bus 74. The multiplexer 101 is clocked by conventional techniques (not shown) to enable the processor 75 to have a throughput rate of 512 KHz, with transmitter rate of 256 KHz and a corresponding receiver rate of 256 KHz.

Inputs from the select circuit 73 on bus 74 are input to stage 1 into a transmission delay circuit T (Transmit) delay 108, which is a 16 sample delay. The delay in each of the stages are shown as indicated to provide proper sample delay times for operation of the processor.

Data is input from bus 74 through multiplexer 101, on bus 113 to conventional switch 102 (a conventional selector 74157) to T delay 109. The other input on bus 74 is input on bus 114 to T delay 108. This other input is an implicit input of zeroes which is a necessary condition for proper operation of the processor 75, and as described in the theoretical approach. At this time, switch 102 connections are interchanged and data through T delay 108 is switched to T delay 109 and data on bus 113 is switched to bus 118.

Data from T delay 109 is output on bus 117 to the arithmetic section 119. Bus 117 corresponds to the upper path described in FIG. 7. Data on bus 118 is input to the arithmetic section 119. Bus 118 corresponds to the lower path of FIG. 7.

During a receiver cycle, data is input from the weighting network on buses 89-1, 89-2. The data is input to conventional adder 121, and subtractor 122 (25LS15), with one output on bus 124 is input through multiplexer 101 and bus 113 to R (Receive) delay 111, a 16 sample delay. Data from bus 125 is input through multiplexer 101 and bus 114 into R delay 110 during one half cycle. Data from T delay 111 is input on bus 117 to arithmetic section 119. Data from R delay 110 is input on bus 118 to arithmetic section 119.

During the next half cycle, switch connections in switch 102 are changed so that data from R delay 110 is input to R delay 111 and the data from delay 111 is input on bus 117 to the arithmetic unit 119. Data from bus 113 is switched to the arithmetic unit 119 on bus 114 to correspond with data from delay 110.

Each arithmetic unit 119 is similar to that described in FIG. 7.

The coefficients for multiplying with the data input are predetermined in accordance to that already described in the theoretical approach. The sine and cosine values are stored in conventional PROMS and are appropriately multiplied to the respective multipliers in the stages 1–6 by timing techniques well known in the art.

The coefficients used for multiplication in the particular stages of the processor are set forth in Table II.

TABLE II

| STAGE | VALUES OF k FOR $e^{j2\pi k/64}$ |
|---|---|
| 1 | None |
| 2 | k = 0, 16 |
| 3 | k = 0, 8, 16, 24 |
| 4 | k = 0, 4, 8, ... 28 |
| 5 | k = 0, 2, 4, ... 30 |
| 6 | k = 0, 1, 2, ... 31 |

As seen in FIG. 1, transmitter output of the processor 75 is on buses 76-1, 76-2 to the weighting networks 77. This output contains different frequency components for each voice channel corresponding to the frequency spectra scheme shown in FIG. 14, but with some overlap for each channel. The weighting network 77 removes these overlaps.

The receiver output is on bus 90 is input to sideband select circuit 91.

While the processor 75 has been described using a 2N point transform, it is possible to incorporate a processor using only a N point transform, thereby reducing hardware requirements.

Referring now to FIG. 10, the input portion of weighting network 77 is now described.

The weighting network 77 is a tapped delay line network which includes 192 taps. The weighting coefficients gm are stored in conventional PROMs, and correspond to equation (6) in the theoretical discussion. The coefficients have been evaluated, as set forth in Table III, from a computer program evaluation which is typical of programs known in the art. A typical program which could be utilized for evaluating the coefficients is set forth in an article entitled "A Computer Program for Designing Optimum FIR Linear Phase Digital Filters", published in *IEEE Transactions on Audio and Electroacoustics*, Volume AU-21, Number 6, December, 1973, Pages 506–526.

Because of symmetry conditions which exist in the weighting coefficients, 96 real and imaginary coefficients are utilized for the weighting network.

In FIG. 10, the Blocks 0-2 have been identified, in accordance with the theoretical discussion for a block where $P = 3$.

TABLE III

| COEFFICIENTS OF REAL FILTER | | |
|---|---|---|
| g0 = −0.00021362 | g19 = −0.01168823 | g39 = 0.07199097 |
| g1 = −0.00067139 | g20 = −0.01086426 | g40 = 0.07791138 |
| g2 = −0.00140381 | g21 = −0.01031494 | g41 = 0.08325195 |
| g3 = −0.00207520 | g22 = −0.00973511 | g42 = 0.08660889 |
| g4 = −0.00256348 | g23 = −0.00854492 | g43 = 0.08767700 |
| g5 = −0.00292969 | g24 = −0.00631714 | g44 = 0.03709717 |
| g6 = −0.00341797 | g25 = −0.00323486 | g45 = 0.08593750 |

TABLE III-continued

| | | | | | |
|---|---|---|---|---|---|
| g7 = −0.00430298 | g26 = 0.00009155 | g46 = 0.08477783 |
| g8 = −0.00558472 | g27 = 0.00305176 | g47 = 0.08337402 |
| g9 = −0.00898853 | g28 = 0.00576782 | g48 = 0.08096313 |
| g10 = −0.00814819 | g29 = 0.00912476 | g49 = 0.07681274 |
| g11 = −0.00891113 | g30 = 0.01443481 | g50 = 0.07101440 |
| g12 = −0.00939941 | g31 = 0.02239990 | g51 = 0.06414795 |
| g13 = −0.00994873 | g32 = 0.03244019 | g52 = 0.05706787 |
| g14 = −0.01083374 | g33 = 0.04284668 | g53 = 0.05020142 |
| g15 = −0.01190186 | g34 = 0.05157571 | g54 = 0.04339600 |
| g16 = −0.01278687 | g35 = 0.05746460 | g55 = 0.03634644 |
| g17 = −0.01303101 | g36 = 0.06094360 | g56 = 0.02886963 |
| g18 = −0.01254272 | g37 = 0.06353760 | g57 = 0.02127075 |
| | g38 = 0.06698608 | g58 = 0.01419067 |
| g59 = 0.00820923 | g79 = 0.39898682 | |
| g60 = 0.00360107 | g80 = 0.44577026 | |
| g61 = 0.00039673 | g81 = 0.49252319 | |
| g62 = −0.00125122 | g82 = 0.53814697 | |
| g63 = −0.00100708 | g83 = 0.58236694 | |
| g64 = 0.00170898 | g84 = 0.62588501 | |
| g65 = 0.00738525 | g85 = 0.66931152 | |
| g66 = 0.01614380 | g86 = 0.71246338 | |
| g67 = 0.02770996 | g87 = 0.75390625 | |
| g68 = 0.04180908 | g88 = 0.79165649 | |
| g69 = 0.05862427 | g89 = 0.82421875 | |
| g70 = 0.07873535 | g90 = 0.85134888 | |
| g71 = 0.10275269 | g91 = 0.87405396 | |
| g72 = 0.13092041 | g92 = 0.89355469 | |
| g73 = 0.16268921 | g93 = 0.91015625 | |
| g74 = 0.19708252 | g94 = 0.92285156 | |
| g75 = 0.23327637 | g95 = 0.92987061 | |
| g76 = 0.27108765 | | |
| g77 = 0.81106567 | | |
| g78 = 0.35372925 | | |

COEFFICIENTS OF IMAGINARY FILTER

| | | | | | |
|---|---|---|---|---|---|
| g0 = −0.00854492 | g19 = −0.00823975 | g39 = −0.02777100 |
| g1 = −0.00921631 | g20 = −0.00689697 | g40 = −0.03454590 |
| g2 = −0.01138306 | g21 = −0.00585938 | g41 = −0.04190063 |
| g3 = −0.01199341 | g22 = −0.00491333 | g42 = −0.04907227 |
| g4 = −0.01141357 | g23 = −0.00378418 | g43 = −0.05551147 |
| g5 = −0.01055908 | g24 = −0.00244141 | g44 = −0.06134033 |
| g6 = −0.01027598 | g25 = −0.00106812 | g45 = −0.06707764 |
| g7 = −0.01116943 | g26 = 0.00003052 | g46 = −0.07315063 |
| g8 = −0.01260376 | g27 = 0.00067139 | g47 = −0.07940674 |
| g9 = −0.01388550 | g28 = 0.00100708 | g48 = −0.08502197 |
| g10 = −0.01440430 | g29 = 0.00112915 | g49 = −0.08905029 |
| g11 = −0.01406860 | g30 = 0.00106812 | g50 = −0.09100342 |
| g12 = −0.01333618 | g31 = 0.00054932 | g51 = −0.09109497 |
| g13 = −0.01275635 | g32 = −0.00079346 | g52 = −0.09014893 |
| g14 = −0.01254272 | g33 = −0.00317383 | g53 = −0.08859253 |
| g15 = −0.01251221 | g34 = −0.00634766 | g54 = −0.08624268 |
| g16 = −0.01217651 | g35 = −0.00997925 | g55 = −0.08200073 |
| g17 = −0.01123047 | g36 = −0.01367188 | g56 = −0.07485962 |
| g18 = −0.00979614 | g37 = −0.01757813 | g57 = −0.06442261 |
| | g38 = −0.02212524 | g58 = −0.05130005 |
| g58 = −0.03656006 | g79 = 0.41906738 | |
| g60 = −0.02072144 | g80 = 0.42440796 | |
| g61 = −0.00332642 | g81 = 0.42486572 | |
| g62 = 0.01696777 | g82 = 0.41995239 | |
| g63 = 0.04132080 | g83 = 0.41015625 | |
| g64 = 0.06964111 | g84 = 0.39633179 | |
| g65 = 0.10028076 | g85 = 0.37915039 | |
| g66 = 0.13088989 | g86 = 0.35861206 | |
| g67 = 0.15963745 | g87 = 0.33419800 | |
| g68 = 0.18621826 | g88 = 0.30538940 | |
| g69 = 0.21185303 | g89 = 0.27227783 | |
| g70 = 0.23831177 | g90 = 0.23559570 | |
| g71 = 0.26638794 | g91 = 0.19628906 | |
| g72 = 0.29534912 | g92 = 0.15505981 | |
| g73 = 0.32321167 | g93 = 0.11224365 | |
| g74 = 0.34790039 | g94 = 0.06808472 | |
| g75 = 0.36837769 | g95 = 0.02282715 | |
| g76 = 0.38491821 | | |
| g77 = 0.39859009 | | |
| g78 = 0.41009521 | | |

Referring to FIG. 10, data samples numbered 0-31 on bus 76-1, containing real and complex coefficients, are input to multipliers 151, 155, 157 (25LS14) where the samples are sequentially multiplied by complex coefficients g128-g159, g64-g95, g0-g31, respectively, which are stored in conventional PROMs 152, 156, 158. Data samples numbered 32-63 on bus 76-2 are input to multipliers 161, 163, 165, where those samples are sequentially multiplied by complex coefficients g160-191, g96-g127, g32-g63, respectively, which are stored in PROMs 167, 168, 169.

The real part of the output of multiplier 161 is delayed in 32 sample delay 160.

The output of delay 160 is added with the real portion output of multiplier 151 in conventional adder 144 (25LS15). The output of adder 144 is input to 32 sample delay 162.

The real part output of multiplier 163 is added with the data delayed in delay 162 in adder 145, which is input to delay 164. The real part output of multiplier 155 is added with the data in delay 164 in adder 146 and input to delay 166.

The real part of output of multiplier 165 is added with the data in delay 166 in adder 147 and input to delay 170. The real portion of multiplier 157 is added with data from delay 177 in adder 148 and output on bus 80 to the digital to analog converter 81 and low pass filter 82 of FIG. 1. The data is then output from low pass filter 82 on bus 83 in the proper format as depicted in FIG. 14.

The coefficients stored in PROMs 152, 156, 158 and 161, 163, 165 are evaluated as previously described and may for convenience be stored in one conventional PROM with appropriate clocking rechniques (not shown).

Referring now to FIG. 11, the input to weighting network 77 for the demodulation cycle will be described briefly.

Data in FIG. 1 is input on bus 84 in the format depicted in FIG. 14. The data is converted to digital format through sample and hold circuit 86 and A/D converter 87 and input on bus 88 to the weighting network 77.

In FIG. 11, the data input on bus 88 is multiplied and delayed in the following fashion.

The input data on bus 88 is formed by weighting that data with the weighting coefficients gm and the preliminary linkage according to formulae 27 and 30 as previously described.

The coefficients g0-g191 in FIG. 11 are identical to those utilized in conjunction with FIG. 10 and therefore with appropriate time sharing techniques can be utilized as with FIG. 10.

The data on bus 88 are appropriately delayed through 32 sample delays 183-187. Also, data on bus 88 is sequentially multiplied in multiplier 176 by coefficients g0-g31. The outputs of delays 184 and 187 are multiplied with the data input to multipliers 178, 180 by coefficients g64-g95, g128-g159, respectively, added with multiplier 176 output in conventional adder 195, for output to the FET processor 75 on bus 89 - 2.

Similarly, data from delays 183, 185, 187 are multiplied in multipliers 177, 179, 181 by coefficients g32-g63, g96-g127, g160-g191, respectively and added in conventional adder 194 for output to processor 75 on bus 89 - 1.

The receiver portion of processor 75 has already been described with inputs on bus 89 - 1 and 89 - 2 through the six stage processor 75. The processed data is output on bus 90 to sideband select 91.

In FIG. 6, the data inputs to sideband selects 91 - 1 and 91 - 2, which correspond to the real and imaginary portions of data on buses 90 - 1 and 90 - 2, are input to conventional one to eight demultiplexers 93 - 1, 93 - 2. The demultiplexed data is then input to complex low pass filter 96 on bus 94. Outputs to other groups are on buses 95, 126-129.

Referring the FIG. 12, the complex low pass filter 96 for the receiver portion of FIG. 1 is shown, in which data is input on buses 94 - 1 and 94 - 2.

The real portion of the data in FIG. 12 is input to conventional delay 201, which is a 32 sample delay for a particular channel. The storage requirements in FIG. 12 are identical to that of FIG. 5.

The data samples input to delay 201 are multiplied by the filter coefficients $h_R$ (0)-$h_R$ (31) in conventional complex multiplier 202 and added in adder 203.

Similarly, the imaginary part of data on bus 94 - 2 is input to 32 sample delay 204 and multiplied by the imaginary filter coefficients in multiplier 205 and added in adder 206.

The imaginary and real filter coefficients are identical to those of FIG. 5 and therefore with appropriate time sharing techniques may be utilized for both figures. The data from adders 203 and 206 are added in adder 208 to form the real part required for each channel.

In FIG. 1, the data for each channel is output on bus 97 for into conventional D/A converter 98 and analog demultiplexer 37. The individual voice channels are filtered by low pass filters 36 and output on lines 32-35.

As previously described, the coefficients stored in the weighting network can be real and need not be complex. This enables a reduction of storage and computational requirements in the weighting network and Fourier transform processor.

Referring to FIG. 15, a digital filter utilizing a 32 point Discrete Fourier Transform processor 221 and a weighting network 220 having only real coefficients is shown.

In FIG. 15, the input on bus 74 to the processor 221 is from a complex low pass filter such as previously described. The processor performs a 32 point discrete Fourier transform and the output is a complex signal which is sequentially multiplied in multiplier 222 by periodic complex coefficients $e^{jn\pi/64}$, n = 0,1,...31. The coefficients can be stored in conventional PROM (not shown). The real part output of multiplier 222 is input to the weighting network 220 where only real coefficients are stored-these correspond to the $h_m$ of equation (6) in the theoretical discussion.

Similarly, with an input on bus 88 to the weighting network 220 a computation is performed in a similar fashion to that described in conjunction with FIG. 11. The real output of network 220 is multiplied in multiplier 223 to form a complex signal which is input to processor 221. A DFT is performed and output on bus 90 to the complex lowpass filter.

Referring to FIG. 16, a digital filter is shown in which a complex low pass filter is not utilized. The discrete Fourier transform processor 227 takes the real voice channels on bus 226 and computes a discrete Fourier transform in a manner similar to that described in the theoretical discussion. The inputs and output of processor 227 are multiplied in multiplier 229, 230 by the $e^{jn\pi/64}$ coefficients in a similar fashion as for FIG. 15. In this case, the weighting network 228, containing only real coefficients, can utilize the symmetry in the coefficients to reduce the computation by a factor of two. The inputs and outputs to network 228 are similar to that of FIG. 15. The output 231 of processor 227 is a real output for each of the voice channels.

What is claimed is:

1. A digital filter for use in a voice multiplexing system for modulating a series of data samples representing a number of voice channels in time division multiplexed format into a series of data samples representing said voice channels in frequency division multiplexed format comprising:

complex low pass filter means connected to receive said series of time division multiplexed data samples for converting said samples to an analytic signal for each of said voice channels, Fourier transform processor means connected to receive each of said analytic signals for transforming said analytic signals into a frequency division multiplexed signal having frequency components corresponding to different ones of said voice channels and weighting means connected to receive said frequency multiplexed signal for weighting said frequency components with weighting coefficients having predetermined passband characteristics.

2. A digital filter as in claim 1 wherein said low pass filter means include delay means connected to sequentially receive said series of data samples for each voice channel for delaying said samples, storage means for storing predetermined complex filter coefficients having real and imaginary components, multiplier means for sequentially multiplying said received samples by said complex filter coefficients, and adder means for adding the multiplied samples thereby forming a real and an imaginary component of said analytic signal for each of said voice channels.

3. A digital filter as in claim 2 wherein said weighting means include delay means for delaying said frequency components, storage means for storing predetermined weighting coefficients for weighting said frequency components with corresponding passband characteristics, multiplier means for sequentially multiplying said frequency components by said weighting coefficients, and adder means for adding the multiplied components thereby forming said frequency components with said predetermined passband characteristics.

4. A digital filter as in claim 3 wherein said weighting coefficients are real.

5. A digital filter as in claim 3 wherein said weighting coefficients are complex.

6. A digital filter as in claim 1 wherein said processor means includes a fast Fourier transform processor.

7. A digital filter as in claim 1 wherein said processor means includes a Winograd Fourier transform processor.

8. A digital filter as in claim 1 wherein said processor means includes first input means for connecting said data samples representing said number of voice channels to said processor means and second input means for connecting a corresponding number of zero valued data samples to said processor means for simultaneously processing the first and second inputs.

9. A digital filter as in claim 8 wherein said processor means include a pipeline processor.

10. A digital filter as in claim 8 wherein said processor means include a parallel processor.

11. A digital filter for use in a voice multiplexing system for demodulating a series of frequency division multiplexed data samples representing a number of voice channels in a frequency spectra, comprising:

complex weighting network means connected to receive said data samples representing said voice channels where each of said voice channels has a predetermined bandwidth and a center frequency at an odd multiple of one-half of said bandwidth for weighting said samples with predetermined weighting coefficients, Fourier transform processor means connected to receive the weighted samples for transforming said samples into a time division multiplex signal, and complex low pass filter means connected to receive said transformed signal for converting said transformed signal to a series of data samples representing each of said voice channels in time division multiplexed format.

12. A digital filter as in claim 11 wherein said weighting network includes delay means for sequentially delaying said series of data samples, storage means for storing predetermined weighting coefficients, first multiplier means for sequentially multiplying some of the delayed samples by some of said weighting coefficients, second multiplier means for sequentially multiplying others of said delayed samples by others of said weighting coefficients, and adder means for adding said multiplied samples thereby forming weighted samples.

13. A digital filter as in claim 11 wherein said complex lowpass filter means include first delay means for delaying the real component of said transformed signal, second delay means for delaying the imaginary component of said transformed signal, storage means for storing predetermined complex filter coefficients for each channel, multiplier means for multiplying said delayed and imaginary components by corresponding ones of said filter coefficients, adder means for adding the multiplied real and imaginary components thereby forming said time division multiplexed signal representing said number of voice channels.

14. A digital filter for use in a voice multiplexing system for modulating a series of data samples representing a number of voice channels in time division multiplex format into a series of data samples representing said voice channels in a frequency division multiplexed format comprising:

Fourier transform processor means connected to receive said series of time division multiplexed samples representing said voice channels where each of said voice channels has a predetermined bandwidth for transforming said samples into a frequency division multiplexed signal having predetermined frequency components corresponding to different ones of said voice channels, and complex weighting means connected to receive said frequency multiplexed signal corresponding to said voice channels where the center frequency of each voice channel in the frequency multiplexed signal is at an odd multiple of one-half of said bandwidth for weighting said frequency components with weighting coefficients having predetermined passband characteristics.

15. A digital filter as in claim 14 wherein said weighting means include complex lowpass filter means connected to receive said data samples for converting said samples to an analytic signal for each of said voice channels.

16. A digital filter for use in a voice multiplexing system for modulating and demodulating a number of voice channels comprising:

multiplexer means for multiplexing said number of voice channels into a first series of data samples in time division multiplexed format, complex low pass filter means connected to receive said first series of data samples for converting said samples to an analytic signal for each of said voice channels, Fourier transform processor means connected to receive each of the analytic signals for transforming said analytic signals into a frequency division multiplexed signal having frequency components corresponding to different ones of said voice channels, weighting means connected to receive said frequency division multiplexed signal for weighting said frequency components with weighting coefficients having predetermined passband characteristics, first converter means for converting the weighted frequency components into an analog signal having frequency components with predetermined passband characteristics, second converter means for converting an analog signal into a second series of data samples, said weighting means including means for receiving said second series of data samples in frequency division multiplexed format for weighting said second samples with predetermined weighting coefficients, said Fourier transform processor means including means connected to receive said weighted samples for transforming said samples into a time division multiplexed signal, said complex low pass filter means including means connected to receive said transformed signal for converting said transformed signal to said first series of data samples representing each of said voice channels in time division multiplexed format, and demultiplexer means for demultiplexing said first series of data samples into an analog signal for each of said voice channels.

17. A digital filter for use in a voice multiplexing system for modulating a first series of data samples representing a number of voice channels in time division multiplexed format into a second series of data samples in frequency division multiplexed format and for demodulating said second series of data samples into said first series of data samples in time division multiplexed format comprising:

Fourier transform processor means connected to receive said first series of samples representing said voice channels where each of said voice channels has a predetermined bandwidth for transforming said samples into a frequency division multiplex signal having frequency components corresponding to different ones of said voice channels, complex weighting means connected to receive said frequency multiplex signal corresponding to said voice channels where the center frequency of each voice channel in said frequency division multiplex signal is at an odd multiple of one-half of said bandwidth for weighting said frequency components with weighting coefficients having predetermined passband characteristics thereby forming said second series of samples, said weighting means connected to receive said second series of data samples representing said voice channels where each of said voice channels has a predetermined bandwidth and a center frequency at an odd multiple of one-half of said bandwidth for weighting said samples with said coefficients, and said processor means connected to receive said weighted samples for transforming said samples into a time division multiplexed signal representing each of said voice channels thereby forming said first series of samples.

18. A digital filter as in claim 17 wherein said weighting coefficients are real and wherein said processor means includes a number of inputs corresponding to said number of voice channels, storage means for storing predetermined periodic complex coefficients and multiplier means for sequentially multiplying said transformed series of samples and said weighted series of data samples by said periodic complex coefficients.

19. A digital filter for use in a voice multiplexing system for demodulating a series of frequency division multiplexed data samples representing a number of voice channels in a frequency spectra, comprising:
   complex weighting means connected to receive said series of data samples representing said voice channels where each of said voice channels has a predetermined bandwidth and a center frequency at an odd multiple of one-half of said bandwidth for weighting said samples with predetermined weighting coefficients, and
   Fourier transform processor means connected to receive the weighted samples for transforming said weighted samples into a time division multiplex signal representing said number of voice channels.

20. In a digital filter for use in a voice multiplexing system having a first series of data samples representing a number of voice channels in time division multiplexed format and a second series of data samples representing said number of voice channels in frequency division multiplexed format, the method comprising the steps of:
   converting said first samples for each of said voice channels to an analytic signal,
   processing said analytic signal into a frequency division multiplexed signal having predetermined frequency components corresponding to different ones of said voice channels,
   weighting said frequency components with predetermined weighting coefficients having passband characteristics thereby forming a frequency division multiplexed signal having proper passband characteristics for each voice channel,
   weighting said second data samples with said predetermined weighting coefficients,
   transforming said weighted samples into a time division multiplexed analytic signal, and
   converting said transformed signal to a series of data samples representing each of said voice channels in time division multiplexed format.

* * * * *